Figure 1:
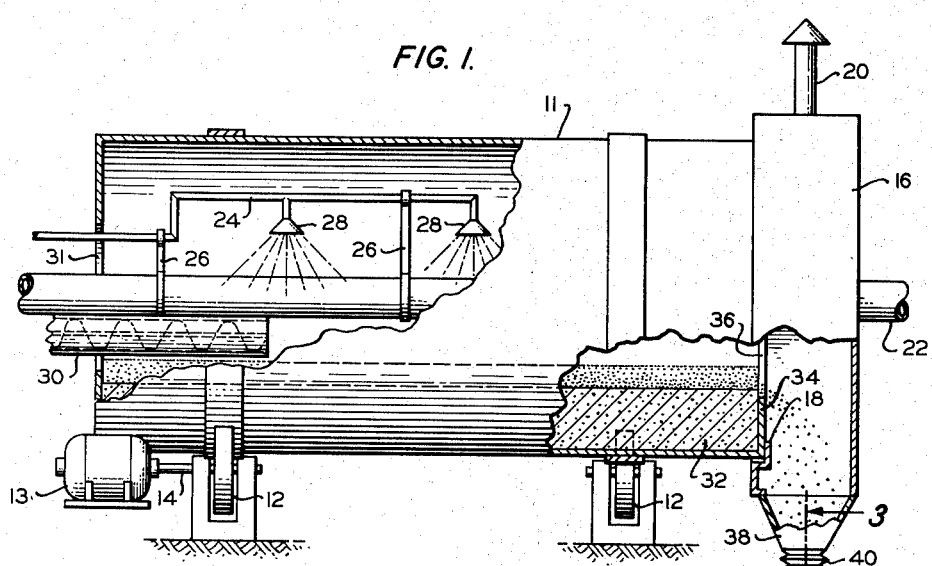

June 16, 1959   G. J. WEBSTER ET AL   2,890,942
PELLETING PROCESS AND APPARATUS
Filed Nov. 21, 1955

INVENTORS
G. J. WEBSTER
C. H. EDWARDS
BY Hudson & Young
ATTORNEYS

United States Patent Office 2,890,942
Patented June 16, 1959

2,890,942
PELLETING PROCESS AND APPARATUS

George J. Webster, Bartlesville, Okla., and Clyde H. Edwards, Borger, Tex., assignors to Phillips Petroleum Company, a corporation of Delaware Application November 21, 1955, Serial No. 547,922

6 Claims. (Cl. 23—314)

This invention relates to a process and apparatus for pelleting carbon black.

In the manufacture of carbon black by various methods, it is common practice to pass the hot carbon black from the manufacturing process directly to a pelleting mill which pellets the loose black by rolling the same in a similar manner to the technique utilized in a tumbling drum. In rolling the particles of loose black, nuclei are formed and these gather particles of the black until small, generally spherical pellets have been formed. The loose black is conventionally introduced to the horizontally rotating cylindrical pelleting mill at one end and as the material is formed into pellets the same progress through the mill to the outlet openings in the delivery end of the mill. The effluent pellets pass by gravity to a conveyor belt which receives the hot pellets and transfers them to packaging or storage or to conveyor equipment which delivers them into a railroad car, ship, or other vehicle for transportation to the point of utilization. One or more conveyor belts may be necessary in conveying the pellets to storage or to shipping facilities.

An improved pelleting technique which increases the rate of pellet production and/or provides a more dense pellet has been developed utilizing a spray of water onto the pellet bed during the tumbling or pelleting process. Normally the carbon black is fed to the pelleting mill in hot condition and at temperatures in the range of 150 to 300° F. During the pelleting the temperature is increased to the range of 250 to 400° F. by friction and the effluent pellets cause rapid deterioration of conveyor belts which are utilized in transferring the pellets to packaging, storage, etc. The water spray technique not only improves the pelleting process but also knocks down the temperature of the effluent pellets so that transfer equipment is not deleteriously effected by the pellets. In processes in which water is sprayed onto the pellet bed during pelleting the heat in the pellet bed vaporizes substantially all of the water sprayed onto the pellets and absorbed by them so that the effluent pellets contain less than about 1 percent by weight of water which is considered specification grade. The resulting water vapor passes out the delivery end of the pellet mill through the delivery slots therein into a hood provided around the delivery end of the mill to seal off the same and prevent escape of carbon black dust into the air surrounding the mill. The vapor is vented from the hood and may be condensed and recycled to the spray step.

A pelleting process utilizing a water spray to decrease the effluent pellet temperature and to improve the pelleting process as well as the apparatus for effecting such a process is fully disclosed in the copending application of Oliver K. Austin, Serial No. 386,585, filed October 16, 1953.

It has been found that during cool or cold weather the low temperature of the hood on the delivery end of the mill causes condensation of a portion of the water vapor on its inside walls as the water vapor passes therethrough. The resulting condensate drips or otherwise gravitates down onto the pellets in the lower part of the hood or in the pellet collection chamber below the hood. This introduction of condensate to the effluent pellets raises their moisture content to a value above 1 percent so that a drying step is necessary in order to reduce the moisture content of the product pellets to an acceptable value. It also forms a carbon black mud on the walls of the lower part of the hood and hopper thereby obstructing free flow of pellets from the hood and hopper. The instant invention provides an improved process and apparatus whereby the condensation of water vapor on the inner walls of the hood of a pelleting mill is avoided so that the effluent pellets contain no more than the maximum permissible amount of water even when the pelleting process is conducted under low temperature atmospheric conditions as are prevalent in carbon black pelleting plants during a substantial portion of the year.

An object of the invention is to provide an improved process and apparatus for pelleting carbon black with the aid of water. Another object is to provide an improved process and apparatus for pelleting carbon black with the aid of water which avoids contacting of the effluent pellets with condensate from the effluent vapor from the pelleting mill when low temperature atmospheric conditions prevail. Other objects of the invention will become apparent from a consideration of the accompanying disclosure.

One aspect of the invention comprises introducing a hot moisture absorbing gas into the hood of a pellet mill operating in the pelleting of carbon black with the aid of a water spray so that the hot moisture-absorbent gas maintains the wall temperature of the hood sufficiently high to prevent condensation thereon. Another aspect of the invention comprises in combination with a pelleting mill, having spray means and a hood on the delivery end thereof, means for passing a hot moisture-absorbent gas through the hood so as to prevent condensation therein.

Figure 2:
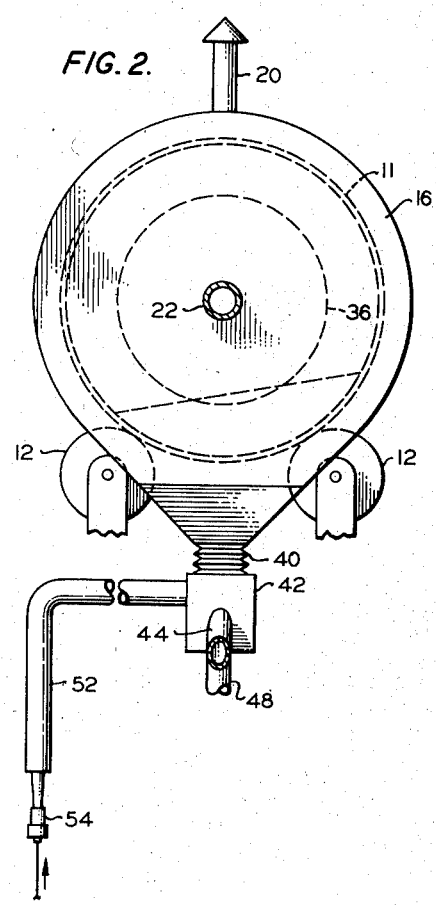
Figure 3:
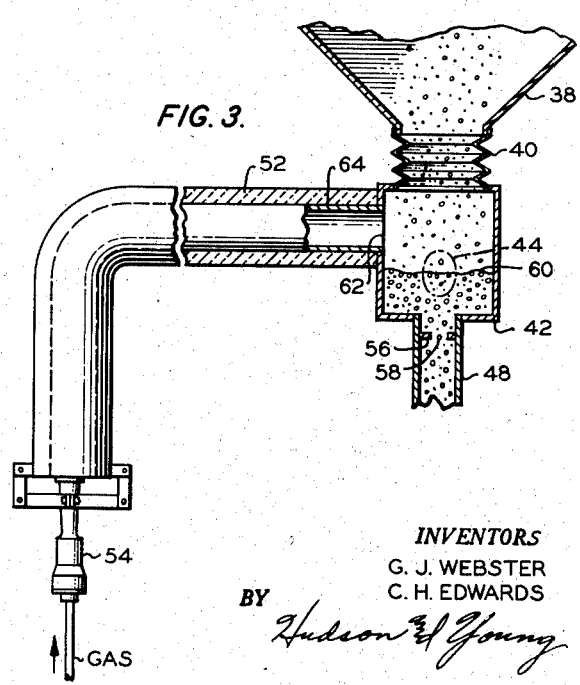

More complete understanding of the invention may be obtained by reference to the accompanying schematic drawing of which Figure 1 is an elevation partly in section of a pellet mill; Figure 2 is an end view of the mill of Figure 1; and Figure 3 is a segmentary view partially in section showing detail of Figure 2. Corresponding elements of the various figures are correspondingly numbered.

Referring to Figure 1, a cylindrical mill 11 is suspended on wheels 12 and is adapted to rotate on its horizontal axis when driven by motor 13 connected to one of the supporting wheels by shaft 14. The mill is provided with a hood 16 which forms a seal 18 with the delivery end of the mill. Hood 16 is provided with a vent or stack 20 and is held in contact with the delivery end of the mill by springs (not shown). A support pipe 22 for scraping equipment (not shown) and for spray equipment comprising a water line 24, supports 26, and sprays 28 extends along the axis of the mill and is supported at the ends by piers (not shown). Support pipe 22 also provides means for supporting feed screw 30 which delivers loose carbon black and recycle pellets to the interior of the mill via opening 31 to form and maintain a bed of carbon black and pellets 32. A weir 34 in the delivery end of the mill regulates the depth of the pellet bed and allows the pellets to flow from the delivery end of the mill through opening 36.

Pellets gravitate from the end of the mill into a hopper 38 attached to the bottom of the hood and through a flexible conduit 40 into a collecting chamber 42 from which the pellets pass in two streams, one, via conduit 44 to conveyor 46 from which they are passed to storage or transportation facilities, and the other, via conduit 48 to a recycle conveyor 50. A heating conduit 52 connects with collecting chamber 42 for introducing hot gas to the hood.

Figure 2 shows the delivery end of the mill including hood 16, wheels 12, stack 20, collecting chamber 42, product conduit 44, recycle conduit 48, and heating conduit 52 which conducts heat from a fuel burner 54 into collection chamber 42 and thence into hood 16 from which the hot gases are vented through stack 20.

Figure 3 shows the detail of the collection chamber heating conduit and effluent pellet conduit arrangement of the invention. Pellets collect in chamber 42 from hopper 38 and a flow control plate 56 provided with orifice 58 passes approximately 50 percent of the pellets passing through collecting chamber 42 into conduit 48 leading to recycle conveyor 50, while the remaining 50 percent of the pellets pass through product conduit 44 to product conveyor 46. The product conduit 44 is positioned above the bottom of chamber 42 but at a level which brings the top level 60 of the pellet mass in chamber 42 below the level of inlet 62 for hot gas from conduit 52. Conduit 52 is provided with a refractory liner 64.

In operation, loose carbon black in hot condition is passed from a collection system downstream of a carbon black furnace or battery of furnaces by a conveyor (not shown) to feeder conveyor 30 (one of a series of such conveyors to a battery of mills) which delivers the loose black into mill 11 along with recycle pellets from recycle conveyor 50. During the pelleting process, a regulated amount of water in the range of about 3 to 45 weight percent of the carbon black is sprayed through line 24 and sprays 28 onto the agitated pellet bed 32 as the mill is rotated by means of motor 13. As the material in bed 32 traverses the mill toward delivery opening 36, the loose black is formed into small pellets which pass over weir 34 and gravitate into collection chamber 42 for division into a recycle stream and a product stream. Water vapor from the hot material in the bed 32 egresses through opening 36 into hood 16 and is vented through stack 20. When atmospheric conditions are such as to normally effect condensation of moisture on the inner walls of hood 16, a suitable fuel such as natural gas is burned in burner 54 and the hot combustion gases pass via conduit 52 into collection chamber 42 above the pellet level 60 therein and pass upwardly through the hood 16 and out stack 20 so as to maintain the temperature of the hood wall above condensation temperature. The amount of gas burned in burner 54 is regulated so as to maintain the hood wall at the desired temperature above the condensation point of vapor therein. Any hot moisture-absorbent gas which does not deleteriously affect the process, apparatus, or product may be used in lieu of the combustion gas.

Other means for effecting a separation of the effluent pellets into a product stream and a recycle stream are conventional in the art and may be utilized in combination with the invention, it being essential that the hood flue gas from burner 54 and conduit 52 be passed upwardly through the hood from a bottom section thereof and preferably through the collection chamber in which the separation of pellets into product and recycle streams is made.

Certain modifications of the invention will become apparent to those skilled in the art and the illustrative details disclosed are not to be construed as imposing unnecessary limitations on the invention.

We claim:

1. In a pelleting process comprising pelleting hot carbon black in a horizontally rotating elongated cylindrical pelleting mill wherein the black temperature in said mill is in the range of 250° to 400° F.; spraying water on said carbon black during pelleting so as to aid in said pelleting; passing effluent pellets through an end of said drum into a hood enclosing the delivery end of said mill and out a lower section of said hood whereby moisture condenses on the inside walls of said hood and gavitates into the effluent pellets; the improvement comprising passing a stream of hot moisture-absorbing gas substantially inert to carbon black through said hood transversely to the end of said mill from an inlet in the lower side of said hood to an outlet in the upper side thereof whereby said pellets are dried by upwardly flowing hot gas and moisture condensation on the inner wall of said hood is substantially prevented.

2. In a process for pelleting hot carbon black comprising feeding hot carbon black at a temperature of at least 250° F. into one end of a horizontally rotating pelleting mill having a pellet outlet at the opposite end covered by a stationary hood to form a pellet bed in said mill; spraying water onto said pellet bed to cool same and improve said pelleting whereby said water reduces pellet temperature and the hot pellets vaporize the major portion of said water; passing resulting water vapor into said hood whereby contact of same with the inside of said hood causes condensation with resulting gravitation of the condensate onto said pellets; the improvement comprising passing a stream of hot combustion gas through said hood transversely to the flow of water vapor from said mill into said hood so that said hot gas passes thru said pellets thereby drying same and preventing moisture condensation on the inner walls of said hood and rewetting of said carbon black.

3. The improvement in claim 2 wherein said hot combustion gas is passed upwardly through said hood from an inlet in the bottom thereof and is vented from an upper section thereof.

4. Apparatus for pelleting carbon black comprising in combination an internally smooth cylindrical pelleting mill rotatable on its horizontal axis, having means for feeding carbon black to one end and means for withdrawing pellets of carbon black from the opposite end; a hood covering the delivery end of said mill through which said pellets pass; a pellet collecting chamber connected with the bottom of said hood; effluent pellet conduit means leading from said chamber; spray means for spraying water into a lower section of said mill; a vent in an upper section of said hood; and a separate gas inlet conduit connected with said chamber at a level above said effluent pellet conduit means.

5. The apparatus of claim 4 including a gas burner in said gas inlet conduit.

6. The apparatus of claim 4 wherein said effluent pellet conduit means for withdrawing pellets comprise a pellet recycle line connected with the front end of said mill and a product pellet line for recovering finished pellets.

References Cited in the file of this patent

UNITED STATES PATENTS

| 2,268,816 | Gabeler et al. | Jan. 6, 1942 |
|---|---|---|
| 2,287,759 | Hardesty et al. | June 23, 1942 |
| 2,304,382 | Shoeld | Dec. 8, 1942 |
| 2,457,963 | Thodos | Jan. 4, 1949 |
| 2,642,343 | Studebaker | June 16, 1953 |